US007937708B2

(12) United States Patent
Kasek et al.

(10) Patent No.: US 7,937,708 B2
(45) Date of Patent: May 3, 2011

(54) COMPUTER SYSTEM AND METHOD FOR ALLOCATING COMPUTATIONAL POWER BASED ON A TWO STAGE PROCESS

(75) Inventors: Hans-Jürgen Kasek, Munich (DE); Jaroslav Verner, Munich (DE); Diogenis Avramidis, Haar (DE); Rolf Dammann, Munich (DE)

(73) Assignee: Fujitsu Siemens Computers GmbH, München (DE)

( * ) Notice: Subject to any disclaimer, the term of this patent is extended or adjusted under 35 U.S.C. 154(b) by 1428 days.

(21) Appl. No.: 11/393,418

(22) Filed: Mar. 30, 2006

(65) Prior Publication Data
US 2006/0248362 A1 Nov. 2, 2006

(30) Foreign Application Priority Data
Mar. 31, 2005 (DE) .................... 10 2005 014 717

(51) Int. Cl.
G06F 9/46 (2006.01)
G06F 9/455 (2006.01)
G06F 15/173 (2006.01)
(52) U.S. Cl. ............ 718/104; 718/1; 718/103; 709/223; 709/224; 709/226
(58) Field of Classification Search .............. 718/1, 103, 718/104; 709/226
See application file for complete search history.

(56) References Cited

U.S. PATENT DOCUMENTS

| | | | |
|---|---|---|---|
| 5,530,860 A | 6/1996 | Matsuura | |
| 6,986,137 B1 * | 1/2006 | King et al. ................... | 718/104 |
| 7,007,276 B1 * | 2/2006 | Kubala et al. ................ | 718/104 |
| 7,222,177 B2 * | 5/2007 | Johnson ...................... | 709/226 |
| 7,516,221 B2 * | 4/2009 | Souder et al. ................ | 709/226 |
| 2002/0161817 A1 * | 10/2002 | Dorofeev et al. ............. | 709/104 |
| 2004/0226015 A1 * | 11/2004 | Leonard et al. .............. | 718/100 |

FOREIGN PATENT DOCUMENTS

| EP | 1 253 516 | 10/2002 |
|---|---|---|
| EP | 1 256 039 | 11/2002 |

OTHER PUBLICATIONS

Chase et al., "Dynamic Virtual Clsuters in a Grid Site Manager", IEEE, 2003, pp. 1-11.*
VMware VirtualCenter User's Manual, VMware, Inc.; Revision 20040929 Version 1.2; pp. 1-37, 177-179, Sep. 29, 2004.

(Continued)

Primary Examiner — Jennifer To
(74) Attorney, Agent, or Firm — Cohen Pontani Lieberman & Pavane LLP

(57) ABSTRACT

A computer system having at least one hardware unit, a control device and a plurality of virtual computer units, and a method for allocating total available computational power within such a computer system, wherein a plurality of virtual computer units can be respectively associated with a group. The computational power is allocated in a plurality of stages by using prescribed rules and taking into account allocation parameters so as to, first, split the available computational power and to allocate the split computational power to the groups and those virtual computer units which do not belong to a group, and then to split the computational power allocated to a group and to allocate the split computational power to each of the plurality of virtual computer units which belong to this group.

5 Claims, 2 Drawing Sheets

OTHER PUBLICATIONS

"Solaris Resource Manager™ 1.1 White Paper", Sun Microsystems White Paper, Sep. 1999, pp. 1-24.

Bettison A. et al., "Limits—A System for Unix Resource Administration", Proceedings of the Supercomputing '89 Conference, Reno, Nevada, Nov. 13-17, 1989, NY, Bd. Conf. 2, pp. 686-692.

Kay J. et al., "A Fair Share Scheduler", Communications of the Association for Computing Machinery, NY, Bd. 31, Nr. 1, Jan. 1988, pp. 44-55.

Examination Report dated Feb. 20, 2008 issued for the corresponding European Patent Application No. EP 06 00 5757.

* cited by examiner

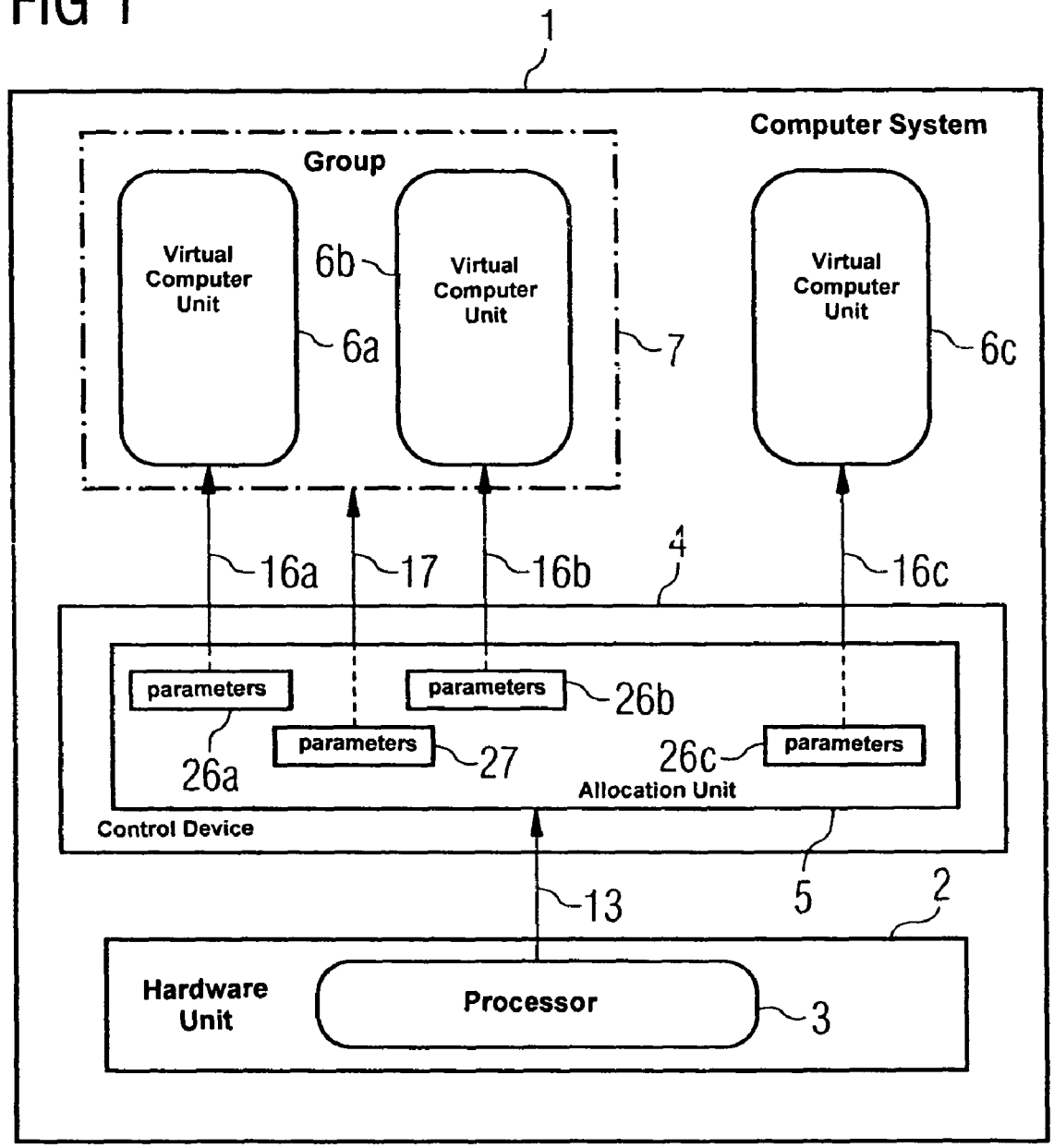

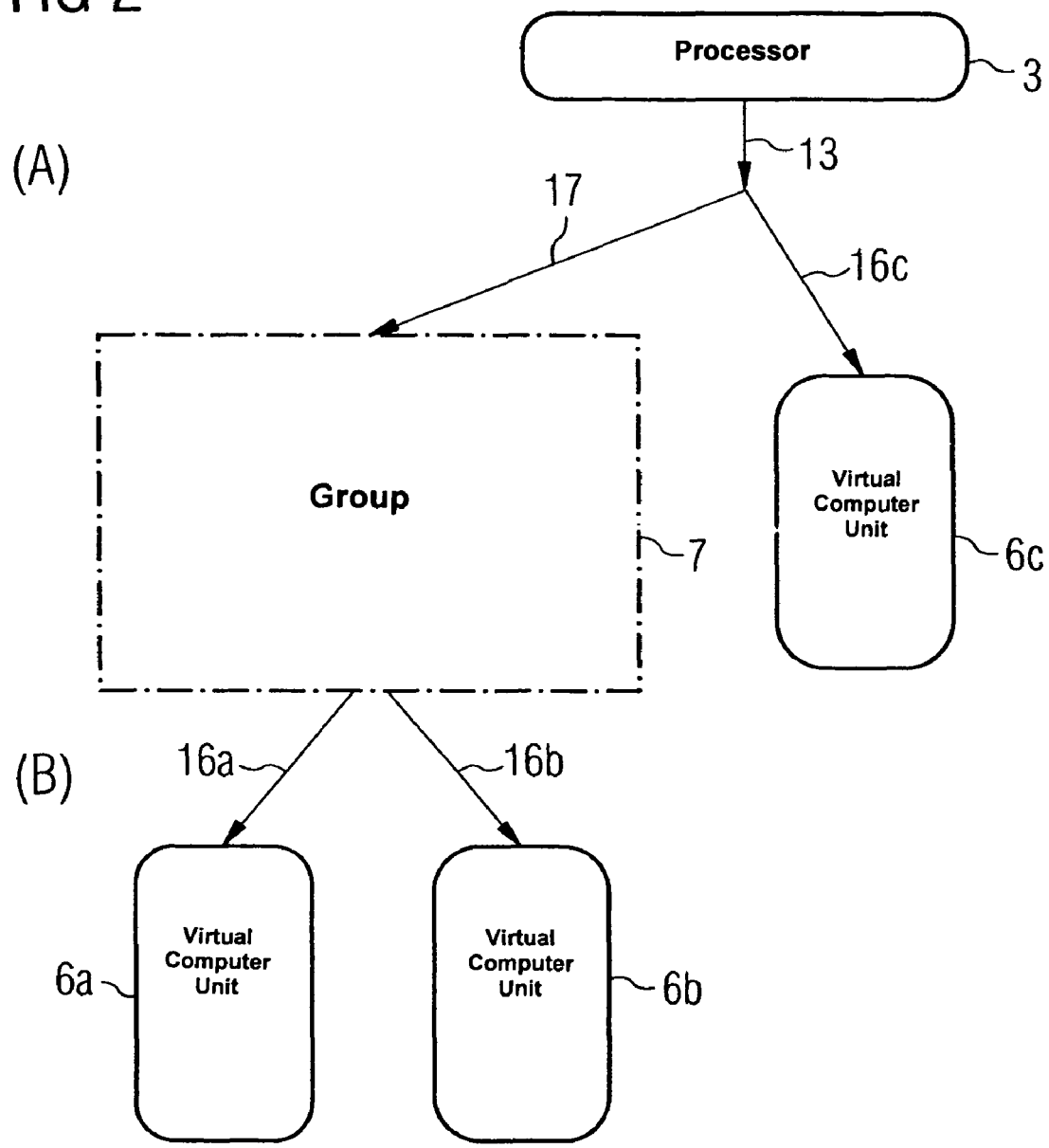

COMPUTER SYSTEM AND METHOD FOR ALLOCATING COMPUTATIONAL POWER BASED ON A TWO STAGE PROCESS

RELATED APPLICATION

This patent application claims the priority of the German patent application no. 10 2005 014 717.8 filed Mar. 31, 2005, the disclosure content of which is hereby explicitly incorporated by reference.

FIELD OF THE INVENTION

The invention relates to a computer system having at least one hardware unit, a control device and at least two virtual computer units, and also to a method for splitting and allocating total available computation power within such a computer system.

BACKGROUND OF THE INVENTION

Particularly in large computer systems, there is often the need to handle a wide variety of diverse tasks in parallel. One way of meeting this requirement flexibly is to operate the computer system as a "virtual machine system". In this case, the computer system provides a plurality of virtual computer units which together share the hardware resources of the computer system but present themselves to the user as independent computer units. In this connection, "independent" means that the individual virtual computer units can execute a wide variety of operating systems with various applications, programs or scripts, and the virtual computer units within the computer system can be addressed independently of one another. Typically, this is achieved through the use of a control device in the computer system, which control device acts as an interface between the hardware resources of the computer system and the virtual computer units. By way of example, the control device may be an operating system on which an emulator is operated which emulates the functionality of computer hardware on one or more logical interfaces. Such a logical interface then has a further operating system coupled to it which is the basis of a virtual computer unit. In this case, the operating system in the virtual computer unit and the operating system underlying the control device do not necessarily need to be of the same type. A known implementation of a computer system with one or more virtual computer units is the virtual machine system VM2000 from the company Fujitsu Siemens Computers, for example.

One important task of the control device is to distribute the hardware resources over the various virtual computer units in a computer system and, in this case, particularly the computer system's total available computation power provided by one or more processors in the computer system. Since the number of virtual computer units does not have to correlate to the number of processors in the computer system, processors are frequently assigned to the various virtual computer units only for short time slices, with this assignment changing so quickly that the user is given the impression of a continuous sequence.

To control the allocation method, the administrator of a computer system can typically provide one or more allocation parameters for the various virtual computer units, said allocation parameters being used to determine each virtual computer unit's allocated share of the total computation power by taking into account the respective computation power requirement for each virtual computer unit. By way of example, it is a known practice to control the allocation method using two parameters per virtual computer unit, a relative computation power share and an upper limit for the computation power. The computation power is allocated such that the ratio of the allocated computation power for the individual virtual computer units corresponds as far as possible to the ratio of the relevant relative computation power shares without the allocated computation power exceeding the respective prescribed upper limit. Other allocation rules based on other allocation parameters are known. Examples which may be mentioned here are allocation rules based on the allocation of priorities, or allocation rules in which the computation power used in the past is also included in the current allocation determination.

In principle, the allocated computation power for an individual virtual computer unit is a stipulation of an upper limit for the computation power which can actually be used. The computation power which is actually used is dependent on the utilization level of the applications which are being executed on the virtual computer units.

Computer service providers using a computer system of the type described frequently provide their customers with the option of being able to use one or more virtual computer units with a stipulated total computation power. The agreed total computation power must be ensured by the service provider, since it is sometimes required for the operations carried out by the customer to run smoothly. Conversely, from the point of view of the service provider it should also not be exceeded unnecessarily, since the rental is typically calculated on the basis of the total computation power.

On the basis of known allocation methods providing for the input of a maximum computation power for each virtual computer unit, each virtual computer unit rented by a customer has a maximum computation power set for it such that the total computation power rented by the customer is obtained in total. If all the virtual computer units rented by a customer are being utilized up to their maximum computation power, it is ensured that the customer also receives the computation power to which he is entitled. If one or more of the virtual computer units is not being utilized up to the maximum power, however, the customer does not receive the full computation power to which he is entitled, even though another virtual computer unit which he is operating might require more than its allocated computation power.

In the case of the known allocation methods, a system administrator would need to intervene manually at this point and match the allocated maximum computation powers for the various virtual computer units to the requirements.

SUMMARY OF THE INVENTION

One object of the present invention is to provide a method for allocating total available computation power within a computer system having at least two virtual computer units which allows more flexible balancing of computation power between particular virtual computer units.

Another object of the present invention is to provide a computer system and a computer program product which are suitable for implementing such a method.

These and other objects are attained in accordance with one aspect of the present invention directed to a method for splitting and allocating total available computation power within a computer system having a plurality of virtual computer units, comprising the steps of forming from at least some of the plurality of virtual computer units at least one group, with each group having two or more associated virtual computer units, and selectively retaining at least one virtual computer unit unassociated with a group. One or more allocation parameters are prescribed for each virtual computer unit and for each group. The total available computation power is allocated by using prescribed rules and taking into account the allocation parameters so as to (a) first, split the available computation power and allocate it to the groups and to virtual computer units which are not associated with a group, if any, and (b) then, split the computation power allocated to a group and allocate it to the virtual computer units which are associated with this group.

Another aspect of the present invention is directed to a computer system comprising at least one hardware unit having one or more processors which provide a particular, total available computation power, a control device, and a plurality of virtual computer units that have access to the hardware unit via the control device. The control device comprises (a) means for forming from at least some of the plurality of virtual computer units at least one group, with each group having two or more associated virtual computer units, and for selectively retaining at least one virtual computer unit unassociated with a group, (b) means for prescribing one or more allocation parameters for each virtual computer unit and for each group, and (c) means for allocating the total available computation power by using prescribed rules and taking into account the allocation parameters so as to, first, split the available computation power and allocate it to the groups and to virtual computer units which are not associated with a group, if any, and then split the computation power allocated to a group and allocate it to the virtual computer units which are associated with this group.

Yet another aspect of the present invention is directed to a computer program product with program code which is suitable for execution on one or more processors, wherein execution of the program code involves the above-described method.

The invention can utilize the idea that selected virtual computer units can be combined to form a (logical) group, and the total available computation power is allocated in a two-stage process. Depending on need, one or more groups can be defined. In a first step, the available computation power is split between and allocated to the groups and those virtual computer units which do not belong to a group. The computation power allocated to a group is then split among and allocated to the virtual computer units which belong to this group in a second step.

Within this basic scheme, it is possible to provide allocation parameters, for example a maximum computation power, for such a group. Such a group could combine all the virtual computer units associated with one customer, for example, which ensures that the total computation power which this customer rents is reflected in the allocation process by the maximum computation power for this group. Within the group, flexible computation power balancing is then possible, again under the control of allocation parameters.

BRIEF DESCRIPTION OF THE DRAWINGS

FIG. 1 shows a schematic block diagram of an exemplary embodiment of the inventive computer system, and FIG. 2 is a tree chart which shows the logical arrangement of groups and virtual computer units in the computer system from the exemplary embodiment in FIG. 1 relative to one another.

DETAILED DESCRIPTION OF THE DRAWINGS

FIG. 1 shows a computer system 1 which comprises a hardware unit 2 with a processor 3. The computer system 1 also has a control device 4 with an allocation unit 5 and three virtual computer units 6a, 6b, 6c. The two virtual computer units 6a and 6b are combined in a group 7. Computation powers which have been provided or allocated are shown by arrows in the drawing. The allocation unit 5 allocates a total available computation power 13 from the processor 3 to the virtual computer units 6a, 6b, 6c as computation powers 16a, 16b, 16c, and to the group 7 as computation power 17. The allocation unit 5 stores allocation parameters 26a, 26b, 26c and 27, with the allocation parameters 26a, 26b, 26c being associated with the virtual computer units 6a, 6b, 6c, and the allocation parameter 27 being associated with the group 7.

In the exemplary embodiment shown in FIG. 1, the computer system 1 has three virtual computer units which are controlled by the control device 4 and share the resources of the hardware unit 2. Besides the processor 3, shared resources may also be main memory, bulk memory, peripheral devices, network components etc., which are not shown here. The example shows a hardware unit 2 with just one processor 3, but in line with the invention the hardware unit 2 could also have a multiplicity of processors 3.

The control device 4 acts as an interface between the hardware unit 2 and the virtual computer units and allows parallel operation of the virtual computer units. By way of example, the control device 4 can achieve this by simulating a virtual processor for each virtual computer unit, said virtual processor being responsible only for this virtual computer unit. If the individual virtual computer units are assigned different, non-overlapping main memory areas, they can be used as independent computer units even though they are using the same hardware unit 2.

Splitting the "computation power" resource is the task of the allocation unit 5. A known mechanism which forms the basis of the splitting of the computation power is to make the processor 3 available to the virtual computer units sequentially for short time periods, frequently called time slices. In this case, a (small as possible) portion of the total available computation power 13 provided by the processor 3 is required for controlling the splitting process itself. By varying the frequency and length of the individual time slices in which the various virtual computer units engage the processor 3, it is possible to have a particular computation power 16a, 16b, 16c allocated to the individual virtual computer units 6a, 6b, 6c.

Within the context of the application, allocating a computation power means that the relevant virtual computer unit is allowed no more than this computation power. Allocated computation powers should always be regarded as maximum computation powers; the computation power actually required by a virtual computer unit may naturally be below the allocated computation power at any time.

On the basis of the prior art, the computation powers 16a, 16b, 16c which are allocated to the individual virtual computer units 6a, 6b, 6c are determined by the allocation unit 5 using prescribed rules and prescribable allocation parameters 26a, 26b, 26c. A control device and an allocation unit according to the prior art are known, for example, from the VM2000 virtual machine system available from Fujitsu-Siemens Computers GmbH of Munich, Germany. In the VM2000 virtual machine system, the control device and the allocation unit are part of a unit called "Hypervisor".

In line with the invention, the determination of the computation powers may also be controlled by virtue of two or more of the virtual computer units being combined to form a group, and allocation parameters likewise being able to be prescribed for this group. In the example shown, a group 7 has been set up, which comprises the virtual computer units 6a and 6b. For the group 7, the allocation parameters 27 are stored in the allocation unit 5. In this case, an arbitrary number of groups can be defined, with the restriction that the groups must not overlap, that is to say a virtual computer unit must be associated with a plurality of groups. A single group which contains all the virtual computer units in a computer system 1 is conceivable. The virtual computer units are selectively associated with a group. The word "selectively" applies not only to associating a virtual computer unit with a particular group, but also to the possibility of leaving it unassociated with any group. Configurations in which all the virtual computer units are associated with a single group or in which none of the virtual computer units is associated with any group inherently provide no additional benefit over the prior art, but also have no negative influence on the allocation process. Usefully, the stipulation of allocation parameters and the establishment of groups are reserved for particular users of the computer system. By way of example, there may be a stipulation that only system administrators who also have control over the control device 4 have these privileges.

The determination of the computation power 16a, 16b, 16c which is allocated to the individual virtual computer units 6a, 6b, 6c is described in more detail below with reference to FIG. 2.

FIG. 2 uses a schematic tree chart to show how the virtual computer units 6a, 6b, 6c and the group 7 from the exemplary embodiment in FIG. 1 are arranged logically relative to one another and how the total available computation power 13 of the processor 3 is split in two steps A and B.

The processor 3 with the total available computation power 13 it provides is the root element of the tree. In the next level of the tree chart, all the groups and those virtual computer units which do not belong to a group are placed next to one another. In this exemplary embodiment, these are the group 7 and the virtual computer unit 6c. The total available computation power 13 is now split in step A between the elements on this level (group 7 and virtual computer unit 6c), with the allocation being controlled by the allocation parameters 17 for group 7 and by the allocation parameter 16 for the virtual computer unit 6c.

In this case, the allocation can be made on the basis of various prescribed rules. By way of example, the allocation parameters may contain an upper limit for the allocated computation power, which must not be exceeded. As a unit for the computation power, in which the upper limit is also specified, it is possible to define a variable which is specific to the computer system 1. By way of example, the total available computation power can be chosen as reference variable and set equal to 1 or 100%.

A further allocation rule is based on specifying relative computation power shares as allocation parameters. In that case, the allocation is made such that the computation powers allocated to the individual elements on this level behave toward one another like the respective relative shares if all the elements have a greater need for computation power than is available in total. If one or more elements has a lower computation power requirement, the computation power which is not used by this element is allocated to the other elements in turn on the basis of their relative shares. It is advantageous to combine both of the allocation rules presented. In that case, the respective smaller value from both rules is actually allocated.

In the subsequent second step B, the computation power of each group is split over the virtual computer units in this group. In the example, the bottom level of the tree structure contains only the two virtual computer units 6a and 6b associated with group 7. The computation power 17 allocated to group 7 in step A is split into the computation powers 16a and 16b, which are allocated to the virtual computer units 6a and 6b, with the allocation being controlled by the allocation parameters 26a and 26b. In this case, it is possible to use the same allocation rules as in step A.

As an example, it is assumed that a computation power 17 of 80% has been ascertained for group 7 in step A. If 100% is used as the upper limit for the computation power for the allocation parameters for both virtual computer units, this does not ever result in a restriction. If an identical value is set as the relative share of the computation power for both, the two virtual computer units 6a and 6b share their available computation power for group 7 in exact halves, i.e. each one is able to use a maximum of 40% computation power. If the virtual computer unit 6a is utilizing only 15% computation power, for example, the remaining computation power of 25% is awarded to the other virtual computer unit 6b on the basis of the allocation rule using the relative computation power shares, and this computer unit 6b is consequently allocated a computation power 16b of 65%. Overall, however, the two virtual computer units 6a and 6b cannot use more than the computation power allocated to group 7 in step A.

The method shown can be repeated in quick succession, so that the computation power is distributed over the various virtual computer units approximately continuously, and in this way the available resources are advantageously used in optimum fashion.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

We claim:

1. A method for splitting and allocating total available computational power within a computer system having a plurality of virtual computer units, comprising the steps of:
   forming from at least some of the plurality of virtual computer units at least one group, with each group having a plurality of associated virtual computer units;
   prescribing at least one virtual computer allocation parameter for each of said plurality of virtual computer units;
   prescribing at least one group allocation parameter for said each group; and
   allocating the total available computational power by using prescribed roles so as to:
   (a) split the total available computational power and allocate the split total computational power to the at least one group and to any those of said plural virtual computer units which do not belong to any group taking into account the at least one group allocation parameter prescribed for said each group and the at least one virtual computer allocation parameter for each of said plurality of virtual computer units which do not belong to any groups, and
   (b) then, split the computational power allocated to the at least one group and allocate to said plural virtual computer units which are associated with the at least one group taking into account the at least one virtual computer allocation parameter prescribed for each of the virtual computer units associated with the at least one group;
   wherein a relative computational power share is prescribed as at least one of the at least one virtual computer allocation parameter for each of said plurality of virtual computer units and as the at least one group allocation parameter for said each group, with a ratio of computational powers allocated to said plurality of virtual computer units or groups being proportional to the relative computational power shares of said plurality of virtual computer units and said each group taken into account separately for each of the allocation sub-steps (a) and (b) if each of said plurality of virtual computer units or groups taken into account are utilizing their allocated computational powers.

2. The method as claimed in claim 1, wherein both the relative computational power share and a maximum computational power are prescribed as at least one of the at least one virtual computer allocation parameter for each said plurality of virtual computer units and the at least one group allocation parameter for said each group, with a criterion of the maximum computational power having priority during the allocation.

3. A method for splitting and allocating total available computational power within a computer system having a plurality of virtual computer units comprising:
  providing at least one allocation parameter for each of said plurality of virtual computer units;
  combining at least some virtual computer units of said plurality of virtual computer units to form a logical group;
  providing at least one allocation parameter for the logical group; and
  allocating a total available computational power in a two-stage process comprising a first step and a second step;
  wherein, during the first step, the total available computational power is split and allocated to the logical group and those of said plurality of virtual computer units which do not belong to any logical group according to the at least one allocation parameter of the logical group and the at least one allocation parameter of each of said plurality of virtual computers units which do not belong to any logical group, respectively;
  wherein, during the second step, the available computational power allocated to the logical group is split and allocated to each of said plurality of virtual computer units which belong to the logical group according to the at least one allocation parameter of each said plurality of virtual computers units which do belong to the logical group;
  wherein the logical group combines each of said plurality of virtual computer units associated with a customer, such that the total available computational power associated with the customer is reflected in the allocation process; and
  wherein the at least one allocation parameter of the logical group corresponds to a maximum computational power rented by the customer such that, during the first step, the maximum computational power rented by the customer is allocated to said plurality of virtual computer units associated with the customer and, in the second step, flexible balancing of the rented maximum computational power is performed under control of the at least one allocation parameters provided for each of said plurality of virtual computer units associated with the customer.

4. The method as claimed in claim 3, wherein
  during said combining step, a plurality of logical groups is formed;
  said step of providing at least one allocation parameter for the logical group is performed for each of said plural logical groups;
  during the first step, the total available computational power is split and allocated to said plurality of logical groups and each of said plurality of virtual computer units which do not belong to any logical group according to the at least one allocation parameter of each of said plurality of logical groups and the at least one allocation parameter of each of said plurality of virtual computer units which do not belong to any logical group, respectively; and
  wherein the second step is performed for each logical group of said plurality of logical groups.

5. A computer program executing on one or more processors, which when used in a computer system having a plurality of virtual computer units, causes the one or more processors to split and allocate total available computational power within the computer system, the computer program comprising:
  program code for providing at least one allocation parameter for each of said plurality of virtual computer units;
  program code for combining at least some virtual computer units of said plurality of virtual computer units to form a logical group;
  program code for providing at least one allocation parameter for the logical group; and
  program code for allocating the total available computational power in a two-stage process comprising a first step and a second step;
  wherein, during the first step, the total available computational power is split and allocated to the logical group and those of said plurality of virtual computer units which do not belong to any logical group according to the at least one allocation parameter of the logical group and the at least one allocation parameter of each of said plurality of virtual computers units which do not belong to any logical group, respectively;
  wherein, during the second step, the available computational power allocated to the logical group is split and allocated to each of said plurality of virtual computer units which belong to the logical group according to the at least one allocation parameter of each said plurality of virtual computers units which do belong to the logical group;
  wherein the logical group combines each of said plurality of virtual computer units associated with a customer, such that the total available computational power associated with the customer is reflected in the allocation process; and
  wherein the at least one allocation parameter of the logical group corresponds to a maximum computational power rented by the customer such that, during the first step, the maximum computational power rented by the customer is allocated to said plurality of virtual computer units associated with the customer and, in the second step, flexible balancing of the rented maximum computational power is performed under control of the at least one allocation parameter provided for each of said plurality of virtual computer units associated with the customer.

* * * * *